United States Patent

[11] 3,596,940

[72] Inventors Laurence G. Horwitt
226 Fountain St., New Haven, Conn. 06515;
Donald J. Mattis, 15 Douglas Drive, Norwalk, Conn. 06850
[21] Appl. No. 17,718
[22] Filed Mar. 9, 1970
Continuation-in-part of Ser. No. 1177, filed Jan. 7, 1970
[45] Patented Aug. 3, 1971

[54] SNAP-FIT CONNECTION
11 Claims, 7 Drawing Figs.
[52] U.S. Cl. ..................................................... 287/20 R, 24/217
[51] Int. Cl. ..................................................... F16b 9/00
[50] Field of Search .......................................... 24/208 R, 208 A, 216, 217, 108; 287/20, 23; 85/DIG. 2

[56] References Cited
UNITED STATES PATENTS
| | | | |
|---|---|---|---|
| 2,912,712 | 11/1959 | Shamban et al. | 85/DIG. 2 |
| 3,243,858 | 4/1966 | Melanson | 24/208 A |

FOREIGN PATENTS
| | | | |
|---|---|---|---|
| 15,365 | 1910 | Great Britain | 24/216 |
| 600,997 | 8/1934 | Germany | 24/208 A |

Primary Examiner—David J. Williamowsky
Assistant Examiner—Andrew V. Kundrat
Attorneys—E. Manning Giles and J. Patrick Cagney ABSTRACT: Snap-fit connection for piece parts of hard material. Shoulders of opposite bevel that border an annular ring portion of one of the parts engage in wedgelike fashion shoulders of opposite bevel that border an annular recess portion of the other part.

PATENTED AUG 3 1971

3,596,940

INVENTORS
Laurence G. Howitt
Donald J. Mattis
BY J. Patrick Cogney
ATTORNEY

SNAP-FIT CONNECTION

The present application is a continuation-in-part of pending application entitled, Mechanical Remote Control Apparatus, application Ser. No. 1,177 filed Jan. 7, 1970, and assigned to assignee of the present invention.

BACKGROUND OF THE INVENTION

The present invention generally relates to mechanical connections and, more specifically, relates to snap-fit connections for hard materials.

It is often desirable in the assembly of various products to be able to snap-fit piece parts together instead of using a threaded connection. One drawback to snap-fit connections which has reduced the incidence of its use in product manufacture is the tendency of the connection to lose its strength with use thereby allowing the connected parts to wobble or become easily separated.

In the case of hard molded parts, considerations of mold design and ease of removal of a part from the mold add to the difficulties of adapting such molded parts for snap-fit interconnection.

SUMMARY OF THE INVENTION

Accordingly, it is a primary object of the present invention to provide a firm, high-strength, snap-fit connection for members of hard material that will retain its strength during usage.

A more specific object of the invention is to provide such a snap-fit connection that is suitable for hard molded members without necessitating complex mold design or problems of removal of a part from the mold.

Briefly, the snap-fit connection of the present invention achieves these objectives as a consequence of unique wedgelike engagement between shoulders of opposite bevel that border an annular ring portion of one of the connected members with shoulders of opposite bevel that border an annular complementarily shaped recess portion of the other member.

A more complete understanding of the invention, its objects, and advantages will be had after reference to the detailed discussion to follow and the accompanying drawings.

BRIEF DESCRIPTION OF THE DRAWINGS

In the accompanying drawings forming a part of the specification and in which like numerals are employed to designate like parts throughout the same.

DETAILED DESCRIPTION

Figure 3:
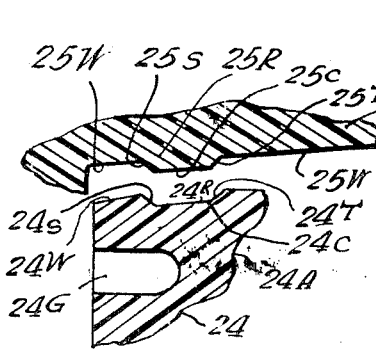
FIG. 3 is an enlarged fragmentary detail view of snap-fit connection structure in accordance with the present invention.
Figure 2:
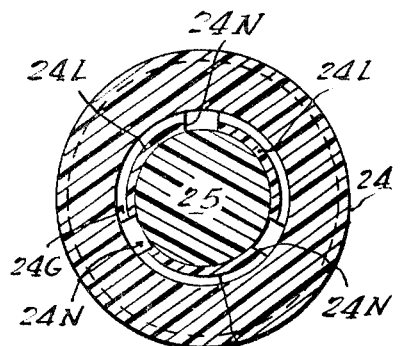
FIG. 2 is a section taken as indicated at 2-2 of FIG. 1.
Figure 1:
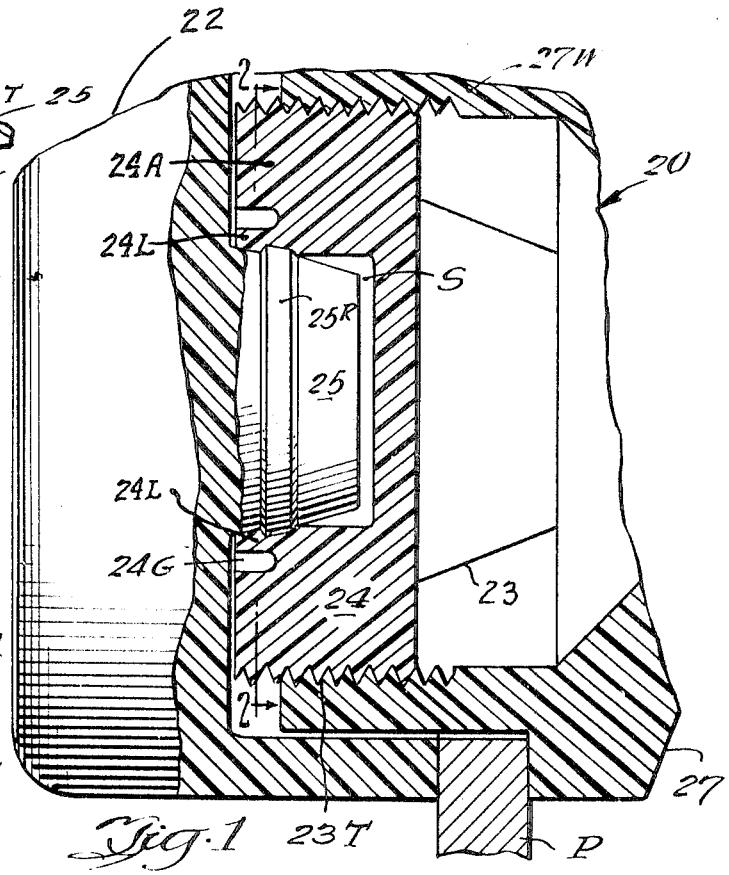
FIG. 1 is an elevational view, partly in section, showing a portion of the control unit of an outside rearview mirror which incorporates the snap-fit connection of the present invention.

FIGS. 1—3 illustrate a portion of the control unit 20 of a remote control rearview mirror which is the subject of the above noted copending application.

As more fully described therein, the control unit 20 is mounted upon interior automobile door panel P and is shown to include a cable guide bracket 22 disposed within the door space, a support seat 23 having a socket portion 24 for snap-fit connection to a plug portion 25 of the guide bracket, and a bezel 27 mounted on the exposed face of the door panel P and having a circular wall 27W projecting into screw-threaded engagement with the threaded outer periphery 23T of the actuator seat 23. These parts are clamped to the door panel by turning the bezel 27 onto the actuator seat 23 to draw the actuator seat forwardly until the guide bracket 22 clamps against the panel P.

The connection between the bracket plug 25 and the socket portion 24 of the actuator must be of high strength to enable a firm clamping action to be maintained between the bezel 24, the guide bracket 22 and the vehicle door panel P.

To provide such high strength connection and in accordance with the present invention, the bracket plug portion 25 is shown to have a lengthwise or axial tapering cylindrical sidewall portion 25W provided with a radially outwardly extending annular ring portion 25R of trapezoidal profile (See FIG. 3) presenting a lengthwise or axially tapered cylindrical surface 25C bordered at opposite ends by oblique annular shoulders 25S, 25T of opposite bevel. The socket portion 24 for receiving the plug has an annular wall 24A (FIG. 3) defining a central socket S having a cylindrical sidewall portion 24W (FIG. 3) of corresponding lengthwise taper. The annular wall 24A terminates in a circular array of three symmetrically spaced cantilever leg portions 24L that are of complementary arcuate shape (See FIG. 2). The annular wall 24A has a radially inwardly projecting internal annular recess 24R of trapezoidal profile presenting a lengthwise tapered cylindrical surface 24C bordered at opposite extremities by oblique shoulder surfaces 24S, 24T of opposite bevel.

To define the cantilever legs 24L, the annular wall 24A is provided with a circular groove 24G and a set of three radial notches 24N. The circular groove 24G opens endwise toward the plug 25 and encircles the central socket S to a depth beyond the adjacent shoulder surfaces 24S and the radial notches 24N open endwise toward the plug 25 and lead from the central socket S to the circular groove 24G. The groove and notch configuration enables the degree of leg flexing necessary to accommodate force-fit insertion of the plug 25 into the central socket to effect seating of the annular ring 25R within the annular recess 24R in a relationship wherein the beveled shoulders 24S and 25S engage in wedgelike fashion the beveled shoulders 24T and 25T. The tapered plug and socket structure provides automatic lead-in and cooperates with the beveled shoulders in achieving high strength against pullout. The snap-fit parts are otherwise free of axial engagement so that these shoulders transmit the axial loads between the parts. This relationship achieves an unusually high strength connection which resists pullout under all normal conditions. The strength of the joint against pullout also tends to increase with use.

In the embodiment illustrated in FIGS. 1—3 herein the snap-fit parts shown can be molded of stiff materials such as acetals as marketed under the trademarks Delrin Celcon. The snap-fit arrangement facilitates molding and removal from the mold and, as will be more fully explained hereinafter with reference to the embodiment of FIGS. 6 and 7, enables complex part configurations and surface treatments to be applied to the individual parts prior to final assembly. A unitary structure with surface coatings and other features could not be so provided in many instances. In the illustrated embodiment typical dimensions for a preferred snap-fit connection are:

a taper of 8° for the plug 25, the surface 25C, the central socket S and the surface 24C;

the beveled shoulders 24S, 24T, and 25S, 25T are at 45° to the center axis;

the radial offset of each of the cylindrical surfaces 24C, 25C is about 0.010 inches;

the diameter of the plug 25 is 0.431 inches at the root of the beveled shoulder 25T;

the diameter of the central socket S is 0.441 inches at the root of the beveled shoulder 24T;

the beveled shoulders 24S and 25S are approximately 0.050 and 0.110 inches respectively, from the end of the socket and the groove 24G is 0.078 inches deep, 0.031 inches wide and has a mean diameter of 0.551 inches; and the legs 24L have an inside diameter of 0.465 inches.

Figure 4:
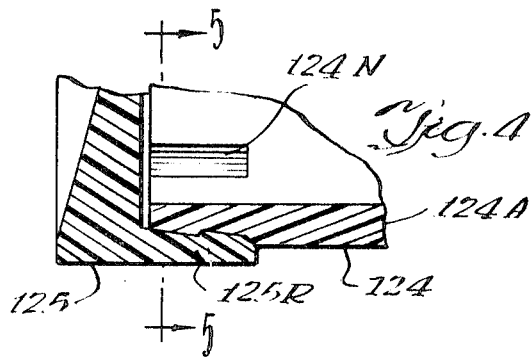
FIG. 4 is a fragmentary detail view illustrating the snap-fit connection in an end closure or cap arrangement.
Figure 5:
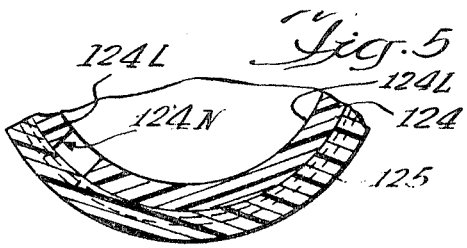
FIG. 5 is a section view taken as indicated at 5-5 of FIG. 4.

FIGS. 4 and 5 illustrate the snap-fit connection assembly as adapted for use as an end closure or cap fitting. In this embodiment the one part is shown as a cup-shaped end closure or cap 125 fitted upon the second part which is shown as the end portion of a hollow cylindrically shaped tube 124. It will be noted that this embodiment differs from that of FIGS. 1—3 in that the inserted part 124 is provided with the annular recessed portion and the cap 125 is provided with the annular ring portion. As shown in FIG. 5, the annular wall 124A of the tube 124 has a set of three radial notches 124N (only one shown), defining the arcuate cantilever legs 124L, opening endwise toward the cap 125 and leading from the interior of the tube 124 to the sidewall 125R of the cap 125. It will further be noted that in the instant embodiment, a circular groove is not required to define the cantilever legs 124L because the thickness of the annular wall 124A permits sufficient flexing. In all other respects, the description of the embodiment of FIGS. 1—3 apply so that such need not be repeated.

Figure 6:
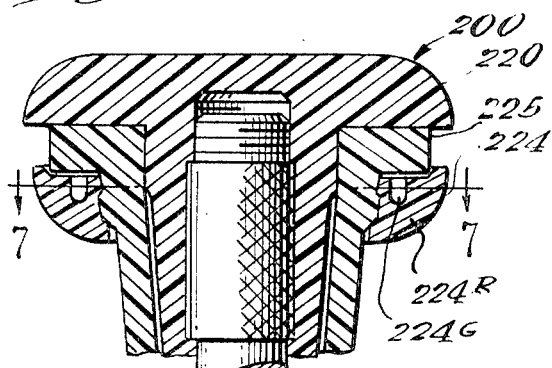
FIG. 6 is a fragmentary detail view of the knob portion of the igniting unit of an electric cigar lighter and illustrating the snap-fit connection in a snapring arrangement.
Figure 7:
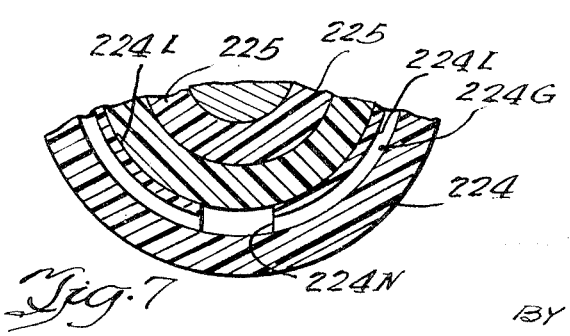
FIG. 7 is a section taken as indicated at 7-7 of FIG. 6.

FIGS. 6 and 7 depict the snap-fit connection assembly as incorporated in a handling knob assembly 200 of the igniting unit of a cigar lighter wherein one piece part is shown to comprise a knob shank 225 and another to comprise a snapring 224 fitted about the shank.

As is well known to those skilled in the particular art, it is desirable that the handling knob be assembled from individual parts rather than be of unitary construction as such facilitates flexibility and ease of ornamentation thereof. Thus, for example, in the specific arrangement shown herein, the knob cap 220 and snap ring 224 are of Black-Abs plastic material while the shank 225 comprises Kralastic MP-2603 finished with chrome plate.

Difficulties have been encountered when assembling the handling knobs from individual parts arising from the problem of providing a strong connection between the parts while at the same time minimizing costs by utilizing molded plastic parts. The snap-fit connection assembly of the resent invention provides a ready solution to such difficulties.

What has been said in reference to FIGS. 1—3 above is applicable to the embodiment of FIGS. 6 and 7 and need not be repeated. Suffice it to say that the snap ring 224 is provided with a circular groove (owing to the thickness of the sidewall portion 224R) opening endwise from the shank 225 and with a set of three radial notches 224N (only one shown), defining the arcuate cantilever legs 224L, opening endwise toward the top of the shank 225 and leading from the circular notch 224G to the sidewall of the shank.

In each of the specific embodiments disclosed herein, both of the interconnected parts have been described as being of a hard molded plastic material. However, it will be appreciated that they need not be plastic and can be of other hard materials, such as brass.

Thus, while preferred constructional features of the invention are embodied in the structure illustrated herein, it is to be understood that changes and variations may be made by those skilled in the art without departing from the spirit and scope of the appended claims.

The embodiments of the invention in which We claim an exclusive privilege or property are defined as follows:

1. In a pair of snap-fit interconnected members having correspondingly axially tapering first and second generally cylindrical sidewall portions in concentric overlapping relation, said first sidewall portion having an annular ring portion projecting therefrom presenting a correspondingly axially tapered cylindrical surface bordered at its opposite axial extremities by oblique shoulder surfaces of opposite bevel, said second sidewall portion having an annular recess therein accommodating said ring portion and presenting a correspondingly axially tapered cylindrical surface bordered at its opposite axial extremities by oblique shoulder surfaces of opposite bevel for wedgelike engagement with the shoulder surfaces of said first sidewall portion, one of said sidewall portions terminates in a circular array of spaced cantilever leg portions, said leg portions having base regions located adjacent one of said shoulder surfaces of the last-named sidewall portion.

2. In a pair of snap-fit interconnected members in accordance with claim 1 wherein each of said sidewall portions are axially tapered at approximately 8°.

3. In a pair of snap-fit interconnected members in accordance with claim 1 wherein each of said oblique shoulder surfaces are axially beveled at approximately 45°.

4. In a pair of snap-fit interconnected members in accordance with claim 2 wherein each of said oblique shoulder surfaces are axially beveled at approximately 45°, said annular ring portion and said annular recess portion each being offset from the corresponding sidewall portion about 0.010 inches.

5. In a pair of snap-fit interconnected members in accordance with claim 1, said cantilever leg portions being of complementary arcuate shape in transverse section.

6. In a pair of snap-fit interconnected members in accordance with claim 5 wherein each of said oblique shoulder surfaces are axially beveled at approximately 45°, each of said sidewall portions are axially tapered at approximately 8°, and said annular ring portion and said annular recess portion each being offset from its corresponding sidewall portion about 0.010 inches.

7. In a snap-fit mechanical connection of first and second members, the first of said members having an axially tapering cylindrical sidewall portion, the other of said members having an axially tapering cylindrical sidewall portion terminating in a circular array of symmetrically spaced cantilever leg portions of complimentary arcuate shape in transverse section, each of said sidewall portions having a radially offset annular wall portion presenting a correspondingly axially tapered cylindrical surface bordered at its opposite axial extremities by oblique shoulder surfaces of opposite bevel, the offset annular wall portion of one of said sidewall portions extending outwardly therefrom, the offset annular wall portion of the other of said sidewall portions extending radially inwardly therefrom, the offset annular wall portion of the sidewall portion of the second of said bodies being located so that a portion of its axial extent intercepts the base regions of said leg portions.

8. In a snap-fit mechanical connection as defined in claim 7, wherein each of said sidewall portions are axially tapered at approximately 8°, each of said oblique shoulder surfaces being axially beveled at approximately 45°.

9. In a snap-fit mechanical connection as defined in claim 8, wherein each said offset annular wall portion is offset on the order of about 0.010 inches.

10. A snap-fit mechanical connection assembly comprising, in combination, a pluglike member of hard molded plastic having a lengthwise tapering insert body provided with a radially outwardly projecting annular ring portion presenting a correspondingly lengthwise tapered cylindrical surface bordered at opposite lengthwise extremities by oblique shoulder surfaces of opposite bevel, and a socket member of hard molded plastic having an annular wall terminating in a circular array of symmetrically spaced cantilever leg portions of complementary arcuate shape in transverse section to border and define a central socket region opening endwise towards the plug member and of corresponding lengthwise taper, said annular wall having a radially outwardly projecting annular recess in open communication with the socket to present a correspondingly lengthwise tapered cylindrical surface bordered at opposite lengthwise extremities by oblique shoulder surfaces of opposite bevel, said recess being located so that a portion of its lengthwise extent intercepts the base regions of said leg portions.

11. A snap-fit mechanical connection assembly comprising, in combination, a plug member of hard molded plastic having a lengthwise tapering insert body provided with a radially outwardly projecting annular ring portion presenting a correspondingly lengthwise tapering cylindrical surface bordered at opposite ends by oblique shoulders of opposite bevel, and a socket member of hard molded plastic having a central socket of corresponding lengthwise taper, said socket member having a radially outwardly projecting annular recess in open communication with the socket to present a correspondingly lengthwise tapered cylindrical surface bordered at opposite ends by oblique shoulders of opposite bevel, said socket member having a circular groove opening endwise towards the plug member and encircling the socket to a depth beyond the adjacent bevel surface thereof, said socket member having radial notches opening endwise toward the plug member and leading from the socket to the groove at peripherally spaced locations about the socket to provide a set of three leg portions for outward flexing to enable lengthwise insertion of the plug body into socket until mechanical interlock of said ring portion in said recess is established.